(12) United States Patent
Tanaka

(10) Patent No.: US 9,739,643 B2
(45) Date of Patent: Aug. 22, 2017

(54) PHYSICAL QUANTITY SENSOR, VIBRATORY DEVICE, ELECTRONIC APPARATUS, AND MOVING OBJECT

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 452 days.

(21) Appl. No.: 14/479,868

(22) Filed: Sep. 8, 2014

(65) Prior Publication Data

US 2015/0070031 A1 Mar. 12, 2015

(30) Foreign Application Priority Data

Sep. 10, 2013 (JP) .................................. 2013-187148

(51) Int. Cl.
*G01D 5/241* (2006.01)
*G01R 27/26* (2006.01)

(52) U.S. Cl.
CPC .................. *G01D 5/241* (2013.01)

(58) Field of Classification Search
CPC ........ G01D 5/24–5/2417; G01R 27/26; G01R 27/2605; G01P 15/08; G01P 15/0802; G01P 15/125; G01C 19/5755
See application file for complete search history.

(56) References Cited

U.S. PATENT DOCUMENTS 5,734,105 A * 3/1998 Mizukoshi ......... G01C 19/5719
73/504.02
6,841,840 B2 1/2005 Sakai 2005/0061075 A1* 3/2005 Sugiura .............. G01C 19/5719
73/514.32
2010/0307246 A1* 12/2010 Fujii ................... B81C 1/00182
73/514.16
2011/0132089 A1* 6/2011 Jeong ..................... G01P 1/023
73/514.32
2012/0111615 A1* 5/2012 Yoda ................... G01P 15/0802
174/257
2012/0267150 A1* 10/2012 Yoda .................. G01C 19/5783
174/257
2014/0284603 A1* 9/2014 Su ........................ B81B 3/0008
257/49

(Continued)

FOREIGN PATENT DOCUMENTS

EP 2237004 A1 10/2010
JP 06-347475 A 12/1994

(Continued)

*Primary Examiner* — Huy Q Phan
*Assistant Examiner* — David Frederiksen
(74) *Attorney, Agent, or Firm* — Harness, Dickey & Pierce, P.L.C.

(57) ABSTRACT

A physical quantity sensor includes a substrate, a fixation section and a wiring line provided to the substrate, a contact section adapted to electrically connect the fixation section and the wiring line to each other, and a movable electrode electrically connected to the wiring line via the fixation section. The contact section is disposed in the fixation section in a second area outside a first area obtained by imaginarily extending a fixed support area in a displacement direction of the movable electrode in a plan view. The fixed support area is sandwiched by edge portions of an area where the movable electrode and the fixation section are connected to each other.

10 Claims, 8 Drawing Sheets

(56) References Cited

U.S. PATENT DOCUMENTS

2015/0168437 A1* 6/2015 Jomori ............... G01C 19/5747
73/496

FOREIGN PATENT DOCUMENTS

| JP | 2004-069562 A | 3/2004 |
| JP | 2012-083112 A | 4/2012 |
| JP | 2013-019906 A | 1/2013 |

* cited by examiner

FIG. 1A
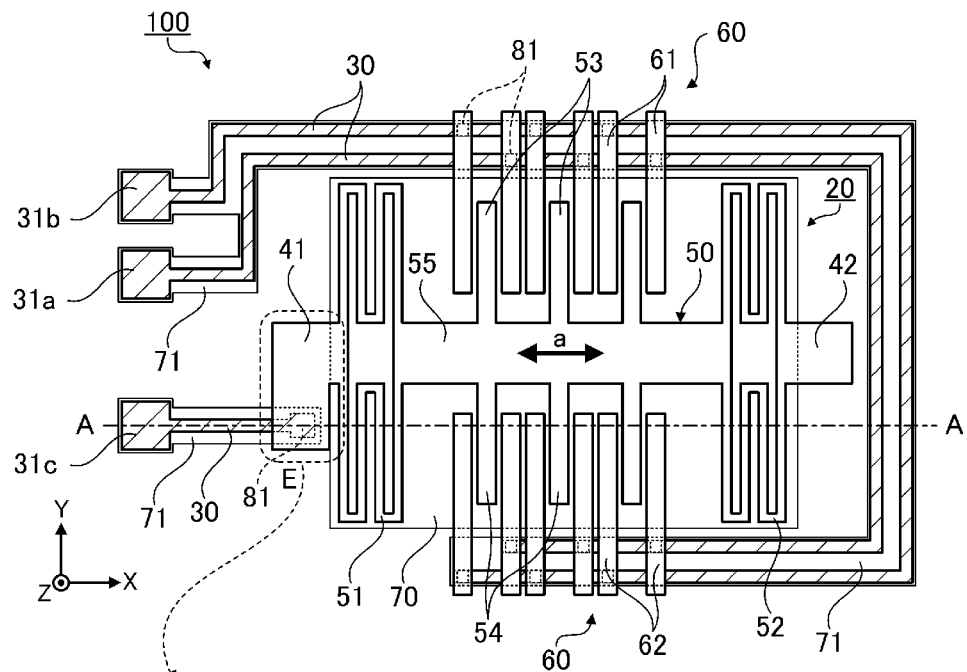
FIG. 1B
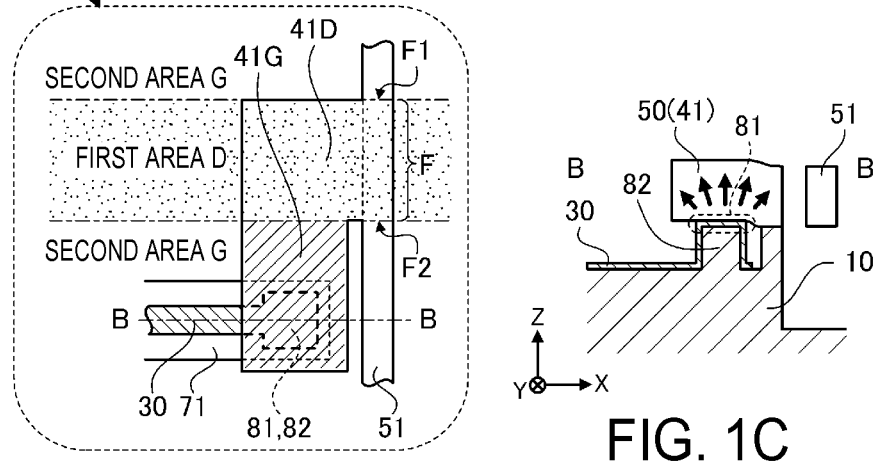
FIG. 1C
FIG. 1D
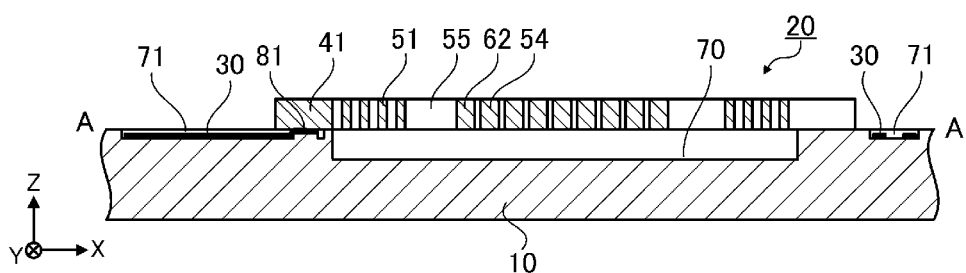

FIG. 2A
Related Art
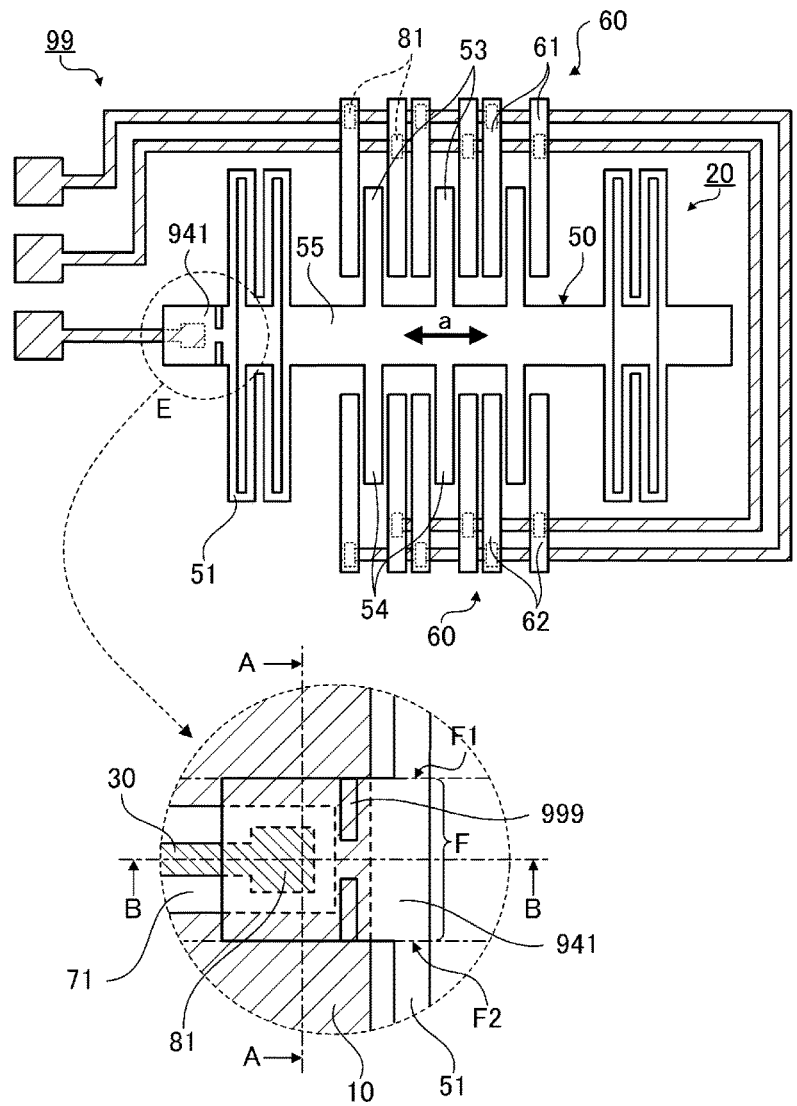
FIG. 2B Related Art
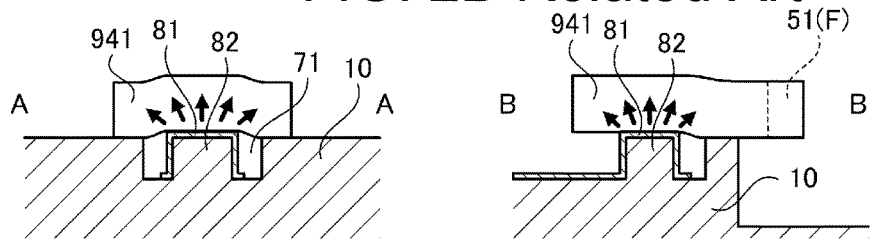
FIG. 2C
Related Art
FIG. 2D
Related Art

PHYSICAL QUANTITY SENSOR, VIBRATORY DEVICE, ELECTRONIC APPARATUS, AND MOVING OBJECT

BACKGROUND

1. Technical Field

The present invention relates to a physical quantity sensor, a vibratory device, an electronic apparatus, and a moving object.

2. Related Art

In general, there are known a physical quantity sensor and a vibratory device as an electromechanical structure provided with a mechanically movable structure. As the physical quantity sensor, there is known, for example, a capacitive sensor, which is provided with a stationary electrode fixedly disposed on a substrate, and a movable electrode disposed so as to be opposed to the stationary electrode across a gap and to be able to be displaced in accordance with the action of a physical quantity (e.g., acceleration and an angular velocity), and detects the physical quantity based on the capacitance between the stationary electrode and the movable electrode.

Such a capacitive sensor is configured so that a relatively high capacitance is formed by forming the movable electrode and the stationary electrode to have a comb-like shape, and forming the wiring so that the stationary electrode is disposed on one side or both sides of the movable electrode so that the comb teeth of the electrodes are interleaved with each other.

In JP-A-2013-19906, there is proposed a technology for preventing deformation of the movable electrode due to an external stress by disposing stress-blocking slits between a fixation section (an anchor section) of the movable electrode and the movable electrode in a physical quantity sensor having such a structure. According to JP-A-2013-19906, since the external stress is absorbed by the slits, and thus the deformation of the movable electrode can be prevented, degradation of the detection accuracy as the sensor can be prevented.

However, in the technology of JP-A-2013-19906, there is a problem that in some cases, the external stress caused in the fixation section cannot be fully absorbed. Specifically, the problem is as follows. Even in the case in which the slits are provided as described in JP-A-2013-19906, the area (the area between the slits opposed to each other) not provided with the slits remains as an area through which the stress can be directly transmitted from the fixation section to the movable electrode, and further, the area is located in the vicinity of an extension of the displacement direction (moving direction) of a base portion (a portion supported by the fixation section and giving a shape to the comb-like electrode portion) of the movable electrode, and therefore, in some cases, the movable electrode is deformed or the displacement of the movable electrode is affected by the stress depending on the stress generated in the fixation section. In particular, in the case of a configuration in which the electric wiring to be connected to the fixation section is disposed in an under layer below the fixation section, and is made to have contact with the fixation section from the under layer, there is a problem that an upthrust stress caused in the contact section by the under layer cannot be fully absorbed by the stress-blocking slits.

SUMMARY

An advantage of some aspects of the invention is to solve at least a part of the problems described above, and the invention can be implemented as the following application examples or forms.

Application Example 1

This application example is directed to a physical quantity sensor including a substrate, a fixation section and a wiring line provided to the substrate, a contact section adapted to electrically connect the fixation section and the wiring line to each other, and a movable electrode electrically connected to the wiring line via the fixation section, and the contact section is disposed in the fixation section in a second area outside a first area obtained by imaginarily extending a fixed support area, which is sandwiched by edge portions of an area where the movable electrode and the fixation section are connected to each other, in a displacement direction of the movable electrode in a plan view.

According to this application example, the contact section is disposed in the fixation section in the second area outside the first area obtained by imaginarily extending the fixed support area, which is sandwiched by the edge portions of the area where the movable electrode and the fixation section are connected to each other, in the displacement direction of the movable electrode in the plan view.

In general, the contact section in which members formed of respective materials different from each other, or members formed to have independent shapes different from each other although formed of the same material have contact with each other generates a stress (a mechanical stress or a thermal stress) to the members having contact with each other (the fixation section) in some cases due to a difference in thermal expansion coefficient between the materials, shapes of the members, a structure of the contact, and so on. According to this application example, the contact section is disposed in the fixation section in the second area outside the first area. Therefore, it results that the stress generated in the contact section is not directly transmitted to the fixed support area (i.e., the area including the part where the movable electrode and the fixation section are connected to each other), but is transmitted from the second area to the fixed support area via the fixation section in the first area.

Therefore, even in the case of adopting the configuration in which, for example, the electric wiring line to be connected to the fixation section is disposed in the under layer of the fixation section to thereby be made to have contact with the fixation section from the under layer of the fixation section, a degree of transmission of the stress (the stress of pushing up the contact section from the under layer of the fixation section) to the movable electrode can be reduced. As a result, it is possible to inhibit the stress applied to the movable electrode from deforming the movable electrode, and from affecting the displacement of the movable electrode, and thus, the degradation of the detection accuracy as the sensor can be prevented.

Application Example 2

This application example is directed to a physical quantity sensor including a substrate, a fixation section and a wiring line provided to the substrate, a contact section adapted to electrically connect the fixation section and the wiring line to each other, and a movable electrode electrically connected to the wiring line via the fixation section, and the contact section is disposed in the fixation section continuously disposed via the fixation section in a second area outside a first area obtained by imaginarily extending a fixed support area, which is sandwiched by edge portions of an area where the movable electrode and the fixation section are connected to each other, in a displacement direction of the movable electrode in a plan view.

According to this application example, the contact section is disposed in the fixation section continuously disposed via the fixation section in the second area outside the first area obtained by imaginarily extending the fixed support area, which is sandwiched by the edge portions of the area where the movable electrode and the fixation section are connected to each other, in the displacement direction of the movable electrode in the plan view.

According to this application example, the contact section is disposed in the fixation section continuously disposed via the fixation section in the second area outside the first area. Therefore, it results that the stress generated in the contact section is not directly transmitted to the fixed support area (i.e., the area including the part where the movable electrode and the fixation section are connected to each other), but is transmitted to the fixed support area via the fixation section in the second area outside the first area and the fixation section in the first area. Therefore, even in the case of adopting the configuration in which, for example, the electric wiring line to be connected to the fixation section is disposed in the under layer of the fixation section to thereby be made to have contact with the fixation section from the under layer of the fixation section, a degree of transmission of the stress (the stress of pushing up the contact section from the under layer of the fixation section) to the movable electrode can be reduced. As a result, it is possible to inhibit the stress applied to the movable electrode from deforming the movable electrode, and from affecting the displacement of the movable electrode, and thus, the degradation of the detection accuracy as the sensor can be prevented.

Application Example 3

This application example is directed to the physical quantity sensor according to the application example described above, wherein the fixation section and the wiring line are electrically connected to each other by the contact section so that the fixation section covers a part of the wiring line in a plan view.

Even in the configuration in which the electric wiring line to be connected to the fixation section is disposed in the under layer of the fixation section to thereby be made to have contact with the fixation section from the under layer as in this application example, since the degree of transmission of the stress generated in the contact section to the movable electrode is reduced, the deformation of the movable electrode and the influence on the displacement of the movable electrode can be suppressed, and the degradation of the detection accuracy as the sensor can be prevented.

Application Example 4

This application example is directed to the physical quantity sensor according to the application example described above, wherein the movable electrode includes a connection portion, and the fixed support area is an area sandwiched by edge portions of an area where the connection portion and the fixation section are connected to each other.

According to this application example, the fixed support area is the area sandwiched by the edge portions of the area where the connection portion and the fixation section are connected to each other. The connection portion can be configured as, for example, a bend section with which the movable electrode can more easily be displaced. In such a configuration, since the stress to be transmitted from the contact section to the fixed support area, namely the area including the part where the connection portion and the fixation section are connected to each other, is reduced, the stress applied to the movable electrode is inhibited from deforming the movable electrode, and from affecting the displacement of the movable electrode, and thus, the degradation of the detection accuracy as the sensor can be prevented.

Application Example 5

This application example is directed to the physical quantity sensor according to the application example described above, the substrate is a glass substrate, and the fixation section and the movable electrode are formed of a silicon substrate stacked on the glass substrate.

According to this application example, the fixation section and the movable electrode can more easily and conveniently be formed by patterning and photo-etching the silicon substrate stacked on the glass substrate using a photolithography process. Further, even in the case in which a thermal stress is generated in the contact section due to a difference in thermal expansion coefficient between the glass substrate and the silicon substrate, since there is adopted the configuration in which the stress to be transmitted from the contact section to the fixed support area is reduced, it is possible to inhibit the stress applied to the movable electrode from deforming the movable electrode, and from affecting the displacement of the movable electrode, and thus, the degradation of the detection accuracy as the sensor can be prevented.

Application Example 6

This application example is directed to a vibratory device including a substrate, a fixation section and a wiring line provided to the substrate, a contact section adapted to electrically connect the fixation section and the wiring line to each other, and a movable electrode electrically connected to the wiring line via the fixation section, and the contact section is disposed in the fixation section in a second area outside a first area obtained by imaginarily extending a fixed support area, which is sandwiched by edge portions of an area where the movable electrode and the fixation section are connected to each other, in a direction along a vibrating surface of the movable electrode in a plan view.

According to this application example, the contact section is disposed in the fixation section in the second area outside the first area obtained by imaginarily extending the fixed support area, which is sandwiched by the edge portions of the area where the movable electrode and the fixation section are connected to each other, in the direction along the vibrating surface of the movable electrode in the plan view.

In general, the contact section in which members formed of respective materials different from each other, or members formed to have independent shapes different from each other although formed of the same material have contact with each other generates a stress (a mechanical stress or a thermal stress) to the members having contact with each other (the fixation section) in some cases due to a difference in thermal expansion coefficient between the materials, shapes of the members, a structure of the contact, and so on. According to this application example, the contact section is disposed in the fixation section in the second area outside the first area. Therefore, it results that the stress generated in the contact section is not directly transmitted to the fixed support area (i.e., the area including the part where the movable electrode and the fixation section are connected to each other), but is transmitted from the second area to the fixed support area via the fixation section in the first area.

Therefore, even in the case of adopting the configuration in which, for example, the electric wiring line to be connected to the fixation section is disposed in the under layer of the fixation section to thereby be made to have contact with the fixation section from the under layer of the fixation section, a degree of transmission of the stress (the stress of pushing up the contact section from the under layer of the fixation section) to the movable electrode can be reduced. As a result, it is possible to inhibit the stress applied to the movable electrode from deforming the movable electrode, and from affecting the displacement (vibration) of the movable electrode, and thus, the degradation of the accuracy as the vibratory device can be prevented.

Application Example 7

This application example is directed to a vibratory device including a substrate, a fixation section and a wiring line provided to the substrate, a contact section adapted to electrically connect the fixation section and the wiring line to each other, and a movable electrode electrically connected to the wiring line via the fixation section, and the contact section is disposed in the fixation section continuously disposed via the fixation section in a second area outside a first area obtained by imaginarily extending a fixed support area, which is sandwiched by edge portions of an area where the movable electrode and the fixation section are connected to each other, in a direction along a vibrating surface of the movable electrode in a plan view.

According to this application example, the contact section is disposed in the fixation section continuously disposed via the fixation section in the second area outside the first area obtained by imaginarily extending the fixed support area, which is sandwiched by the edge portions of the area where the movable electrode and the fixation section are connected to each other, in the direction along the vibrating surface of the movable electrode in the plan view.

According to this application example, the contact section is disposed in the fixation section continuously disposed via the fixation section in the second area outside the first area. Therefore, it results that the stress generated in the contact section is not directly transmitted to the fixed support area (i.e., the area including the part where the movable electrode and the fixation section are connected to each other), but is transmitted to the fixed support area via the fixation section in the second area outside the first area and the fixation section in the first area. Therefore, even in the case of adopting the configuration in which, for example, the electric wiring line to be connected to the fixation section is disposed in the under layer of the fixation section to thereby be made to have contact with the fixation section from the under layer of the fixation section, a degree of transmission of the stress (the stress of pushing up the contact section from the under layer of the fixation section) to the movable electrode can be reduced. As a result, it is possible to inhibit the stress applied to the movable electrode from deforming the movable electrode, and from affecting the displacement (vibration) of the movable electrode, and thus, the degradation of the accuracy as the vibratory device can be prevented.

Application Example 8

This application example is directed to the vibratory device according to the application example described above, wherein the fixation section and the wiring line are electrically connected to each other by the contact section so that the fixation section covers apart of the wiring line in a plan view.

Even in the configuration in which the electric wiring line to be connected to the fixation section is disposed in the under layer of the fixation section to thereby be made to have contact with the fixation section from the under layer as in this application example, since the degree of transmission of the stress generated in the contact section to the movable electrode is reduced, the deformation of the movable electrode and the influence on the displacement (the vibration) of the movable electrode can be suppressed, and the degradation of the accuracy as the vibratory device can be prevented.

Application Example 9

This application example is directed to an electronic apparatus including the physical quantity sensor according to the application example described above.

According to this application example, by providing the electronic apparatus with the physical quantity sensor further suppressed in degradation of the detection accuracy, the electronic apparatus with higher operating accuracy can be provided.

Application Example 10

This application example is directed to a moving object including the physical quantity sensor according to the application example described above.

According to this application example, by providing the moving object with the physical quantity sensor further suppressed in degradation of the detection accuracy, the moving object with higher operating accuracy can be provided.

Application Example 11

This application example is directed to an electronic apparatus including the vibratory device according to the application example described above.

According to this application example, by providing the electronic apparatus with the vibratory device further suppressed in degradation of the accuracy, the electronic apparatus with higher operating accuracy can be provided.

Application Example 12

This application example is directed to a moving object including the vibratory device according to the application example described above.

According to this application example, by providing the moving object with the vibratory device further suppressed in degradation of the accuracy, the moving object with higher operating accuracy can be provided.

BRIEF DESCRIPTION OF THE DRAWINGS

Embodiments of the invention will be described with reference to the accompanying drawings, wherein like numbers reference like elements.

FIGS. 1A through 1D are schematic diagrams showing a physical quantity sensor according to a first embodiment of the invention.

FIGS. 2A through 2D are schematic diagrams showing a physical quantity sensor according to the related art.

DESCRIPTION OF EXEMPLARY EMBODIMENTS

Figure 3A:
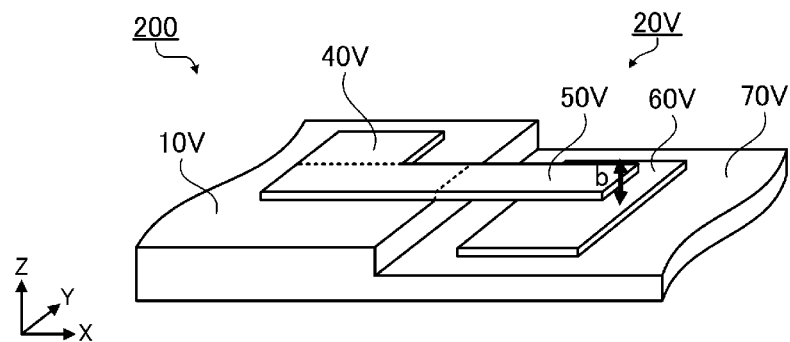
FIGS. 3A through 3C are schematic diagrams showing a vibratory device according to a second embodiment of the invention.

Some embodiments of the invention will hereinafter be explained with reference to the accompanying drawings. The following are each an embodiment of the invention, and do not limit the scope of the invention. It should be noted that in each of the drawings described below, a description with scales different from those in the actual configuration is used in some cases for making the explanation easy to understand.

First Embodiment

Firstly, a physical quantity sensor according to the first embodiment will be explained.

FIGS. 1A through 1D are schematic diagrams showing a physical quantity sensor 100 according to the first embodiment, wherein FIG. 1A is a plan view, FIG. 1B is an enlarged view of the E section shown in FIG. 1A, FIG. 1C is a cross-sectional view along the B-B line shown in FIG. 1B, and FIG. 1D is a cross-sectional view along the A-A line shown in FIG. 1A.

It should be noted that the explanation will hereinafter be presented assuming that in X, Y, and Z directions additionally described in the drawings, the X direction corresponds to the rightward direction, X-axis directions (the ±X directions) correspond to lateral directions, the Y direction corresponds to a depth direction, Y-axis directions (the ±Y directions) correspond to frontward and backward directions, the Z direction corresponds to an upper direction, and Z-axis directions (the ±Z direction) correspond to the upward and downward directions or the thickness direction of a substrate 10 described later.

The physical quantity sensor 100 is provided with the substrate 10, a sensor element 20, wiring lines 30, and so on.

The sensor element 20 is provided with fixation sections 41, 42, a movable electrode 50, a stationary electrode 60, and so on.

The movable electrode 50 is provided with connection portions 51, 52, movable electrode fingers 53, 54, a movable base portion 55, and so on.

The substrate 10 functions as a base substrate, and is a plate-like body for supporting the sensor element 20.

The substrate 10 has an upper surface as a principal surface provided with a recessed portion 70. The recessed portion 70 is formed in an area in which the movable electrode (the connection portions 51, 52, the movable electrode fingers 53, 54, and the movable base portion 55) of the sensor element 20 is fitted in a plan view of the substrate 10.

The fixation sections 41, 42 are disposed in an outside area of the area of the recessed portion 70 in the plan view of the substrate 10 so as to be bonded to the principal surface of the substrate 10. Specifically, the fixation section 41 is bonded to a part on the −X direction side (on the left side in the drawing) of the recessed portion 70 of the principal surface of the substrate 10, and the fixation section 42 is bonded to a part on the +X direction side (the right side in the drawing) of the recessed portion 70. Further, the fixation sections 41, 42 are each disposed so as to straddle the peripheral edge of the recessed portion 70 in the plan view.

The movable base portion 55 is a rectangular plate-like body with the longitudinal direction extending in the X direction, and is supported between the fixation sections 41, 42 via the connection portions 51, 52 so as to be separated from the substrate 10. More specifically, a left end portion of the movable base portion 55 is connected to the fixation section 41 via the connection portion 51, and a right end portion of the movable base portion 55 is connected to the fixation section 42 via the connection portion 52.

A plurality of (three in the present embodiment) movable electrode fingers 53 each having a beam-like shape extends from the long side portion on the +Y side of the movable base portion 55 in the +Y direction, and a plurality of (three in the present embodiment) movable electrode fingers 54 each having a beam-like shape extends from the long side portion on the −Y side of the movable base portion 55 in the −Y direction.

The recessed portion 70 is formed as a clearance for making the movable electrode 50 (the connection portions 51, 52, the movable electrode fingers 53, 54, and movable base portion 55) be separated from the substrate 10. It should be noted that the clearance can also be a through hole penetrating the substrate 10 in the thickness direction instead of the recessed portion 70. Further, the planar shape of the recessed portion 70 presents a rectangular shape in the present embodiment, but is not limited to this shape.

The connection portions 51, 52 movably connect the movable base portion 55 to the fixation sections 41, 42, respectively. In the present embodiment, the connection portions 51, 52 are configured so as to be able to displace the movable base portion 55 in the X-axis directions as indicated by the arrow "a" in FIG. 1A.

The plurality of movable electrode fingers 53 and the plurality of movable electrode fingers 54 are each disposed so as to be arranged in the X-axis directions along which the movable electrode 50 is displaced.

The connection portion 51 is specifically formed of two (a pair of) beams, and they each form a shape extending in the +X direction while meandering in the Y-axis directions. In other words, each of the beams forms a shape folded a plurality of times (three times in the present embodiment) in the Y-axis directions. It should be noted that the number of times of folding of each of the beams can be one or two, or equal to or larger than four.

Similarly, the connection portion 52 is also formed of a pair of beams each forming a shape extending in the −X direction while meandering in the Y-axis directions.

The stationary electrode 60 is provided with a plurality of stationary electrode fingers 61, 62 arranged so as to form a comb-like shape interleaved with the plurality of movable electrode fingers 53, 54 of the movable electrode 50 with gaps.

The stationary electrode fingers 61 are disposed forming pairs (therefore, two by three places) so as to sandwich each of the movable electrode fingers 53 with gaps, and to be opposed to the both sides in the X-axis directions. Further, the stationary electrode fingers 62 are similarly disposed forming pairs (therefore, two by three places) so as to sandwich each of the movable electrode fingers 54 with gaps, and to be opposed to the both sides in the X-axis directions.

The stationary electrode fingers 61, 62 are disposed in an outside area of the area of the recessed portion 70 in the plan view of the substrate 10 on the principal surface of the substrate 10 with one end portion of each of the stationary electrode fingers 61, 62 bonded to the principal surface. Specifically, the end portion of each of the stationary electrode fingers 61 on the opposite side (the +Y side of the movable electrode 50) to the movable electrode 50 is bonded to the upper surface of the substrate 10 in a portion on the +Y direction side of the recessed portion 70. Further, each of the stationary electrode fingers 61 has an end on the fixed side as a fixed end, and a free end extending toward the −Y direction. Similarly, the end portion of each of the stationary electrode fingers 62 on the opposite side (the −Y side of the movable electrode 50) to the movable electrode 50 is bonded to the upper surface of the substrate 10 in a portion on the −Y direction side of the recessed portion 70, and each of the stationary electrode fingers 62 has an end on the fixed side as a fixed end, and a free end extending toward the +Y direction.

By adopting such a configuration, it is possible to vary the capacitance between the stationary electrode fingers (hereinafter referred to as first stationary electrode fingers) each located on the +X side of the corresponding movable electrode finger 53 among the stationary electrode fingers 61 and the corresponding movable electrode finger 53, and the capacitance between the stationary electrode fingers 61 (hereinafter referred to as second stationary electrode fingers) each located on the −X side of the corresponding movable electrode finger 53 among the stationary electrode fingers 61 and the corresponding movable electrode finger 53 in accordance with the displacement of the movable electrode 50.

Similarly, it is possible to vary the capacitance between the stationary electrode fingers 62 (hereinafter similarly referred to as the first stationary electrode fingers) each located on the +X side of the corresponding movable electrode finger 54 among the stationary electrode fingers 62 and the corresponding movable electrode finger 54, and the capacitance between the stationary electrode fingers 62 (hereinafter similarly referred to as the second stationary electrode fingers) each located on the −X side of the corresponding movable electrode finger 54 among the stationary electrode fingers 62 and the corresponding movable electrode finger 54 in accordance with the displacement of the movable electrode 50.

The first stationary electrode fingers and the second stationary electrode fingers are separated from each other on the substrate 10, and are electrically insulated from each other. Therefore, it is possible to separately measure the capacitance between the first stationary electrode fingers and the movable electrode 50 (the movable electrode fingers 53, 54), and the capacitance between the second stationary electrode fingers and the movable electrode 50 (the movable electrode fingers 53, 54) to detect the physical quantity based on the measurement results with high accuracy.

In other words, in the sensor element 20, the movable electrode 50 (the movable electrode fingers 53, 54) are displaced in the X-axis direction (the +X direction or the −X direction) in accordance with the variation of the physical quantity such as the acceleration or the angular velocity while elastically deforming the connection portions 51, 52. The physical quantity sensor 100 can detect the physical quantity such as the acceleration or the angular velocity based on the capacitances varying in accordance with such a displacement.

It should be noted that the shapes of the movable electrode 50 and the stationary electrode 60 are determined in accordance with the shapes, the sizes, and so on of the portions constituting the sensor element 20, and are not limited to the configuration described above.

The wiring lines 30 are electrical connection wiring lines for detecting the capacitances described above, and are laid along the recessed portion 71 provided to the principal surface of the substrate 10. As the wiring lines 30, there are disposed a wiring line for connecting the first stationary electrode fingers to each other and then connecting them to an electrode 31*a* to be connected to an external circuit, a wiring line for connecting the second stationary electrode fingers to each other and then connecting them to an electrode 31*b* to be connected to an external circuit, and wiring line to be connected to the movable electrode 50 and an electrode 31*c* to be connected to an external circuit.

The recessed portion 71 is disposed as an area, in which the wiring lines 30 are laid, in an outside area of the recessed portion 70. In other words, in the plan view of the substrate 10 the recessed portion 71 is formed so that the area in which the wiring lines 30 are laid is fitted in the area of the recessed portion 71.

The depth dimension (the dimension in the thickness direction of the substrate 10) of the recessed portion 71 is made larger than the thickness dimension of the wiring lines 30 and smaller than the depth dimension of the recessed section 70 except for contact sections described later.

The sensor element 20 (the fixation sections 41, 42, the connection portions 51, 52, the movable electrode fingers 53, 54, the movable base portion 55, and the stationary electrode fingers 61, 62) is formed by, for example, performing a patterning process on a single silicon substrate.

The silicon substrate can be processed by etching with high accuracy. Therefore, by constituting the sensor element 20 using silicon substrate as a chief material, it is possible to make the dimensional accuracy of the sensor element 20 excellent, and as a result, an increase in sensitivity of the physical quantity sensor 100 can be achieved. Further, it is preferable that an impurity such as phosphorus or boron is doped in the silicon material constituting the sensor element 20. Thus, the conductivity of the sensor element 20 of the physical quantity sensor 100 can be made superior.

It should be noted that the constituent material of the sensor element 20 is not limited to the silicon substrate, but can be any material capable of detecting the physical quantity based on a variation in the capacitance.

A glass material having an insulating property is used for the constituent material of the substrate 10 as a preferred example. Further, in particular in the case in which the sensor element 20 is constituted by the silicon substrate, it is preferable to use a glass material (e.g., borosilicate glass such as Pyrex (registered trademark) glass) including alkali metal ions (movable ions). Thus, the physical quantity sensor 100 can be configured by anodically bonding the substrate 10 (the glass substrate) and the sensor element 20 (the silicon substrate) to each other.

As described above, by adopting the configuration in which the recessed portion 71 is formed on the principal surface of the substrate 10, and the wiring lines 30 thinner than the depth of the recessed portion 71 are laid in the area of the recessed portion 71, the contact between the wiring lines 30 and the sensor element 20 stacked on an upper layer of the substrate 10 is avoided in the area other than predetermined electrical connection sections.

The predetermined electrical connection sections each denote a contact section where the upper layer constituting the sensor element 20 is stacked so as to partially cover the wiring line 30, and thus the wiring line 30 and the upper layer have contact with each other and are electrically connected to each other.

As shown in FIG. 1A, the wire connection of the first stationary electrode fingers and the second stationary electrode fingers by the wiring lines 30 and the connection between the wiring line 30 and the fixation section 41 are achieved by the contact sections 81. The movable electrode 50 is electrically connected to the wiring line 30 via the fixation section 41.

The constituent material of the wiring lines 30 is not particularly limited as long as electrical conductivity is provided, and a variety of types of electrode materials can be used. Oxides (transparent electrode materials) such as ITO (indium tin oxide), IZO (indium zinc oxide), $In_2O_3$, $SnO_2$, Sb-doped $SnO_2$, and Al-doped ZnO, Au, Pt, Ag, Cu, Al, alloys including any of these metals, and so on can be cited, and can be used alone or in combination.

FIGS. 1B and 1C respectively show an enlarged view and a cross-sectional view of the fixation section 41 including the contact section 81.

In the area of the recessed portion 71, the contact section 81 is provided with a protruding portion 82 (a part where the depth dimension of the recessed portion 71 is smaller than the thickness of the wiring line 30) so that the wiring line 30 and the upper layer (the fixation section 41) have contact with each other. Specifically, in the manufacturing process of the physical quantity sensor 100, the recessed portion 71 is formed so that the protruding portion 82 remains in a part corresponding to the contact section 81 when forming the recessed portion 71 in the principal surface of the substrate 10. The wiring line 30 is stacked so as to overlap at least a part of the protruding portion 82, and thus the pattern formation of the wiring line 30 is performed. Then, the upper layer constituting the sensor element 20 is stacked to make the wiring line 30 on the protruding portion 82 have contact with the upper layer to thereby be electrically connected to the upper layer.

It should be noted that the configuration of the contact section 81 is not limited to the above, but can also be a configuration of disposing an electrically conductive protrusion instead of the protruding portion 82. In other words, there can also be adopted a method of disposing the electrically conductive protrusion on an upper portion of the wiring line 30 in a part in which the contact section 81 is formed in the plan view of the substrate 10, then making the electrically conductive projection have contact with the wiring line 30 and the upper layer constituting the sensor element 20 to be stacked on the electrically conductive protrusion so as to be sandwiched with the wiring line 30 and the upper layer, and thus achieving the conduction via the electrically conductive protrusion.

Further, except the contact sections where the wiring lines 30 and the upper layer constituting the sensor element 20 have contact with each other, an insulating film can also be disposed on the wiring lines 30. The insulating film has a function of avoiding electrical connection (short circuit) between the wiring lines 30 and non-connection part of the sensor element 20. The constituent material of the insulating film is not particularly limited, but a variety of materials having an insulating property can be used. However, in the case in which the substrate 10 is formed of a glass material (in particular, the glass material doped with the alkali metal ions), silicon dioxide ($SiO_2$) is preferably used.

It should be noted that in the case of adopting the structure of making the wiring lines 30 have contact from the lower layer of the sensor element 20 as in the contact sections of the present embodiment, a temperature stress (the upthrust stress from the lower layer indicated by the arrows in FIG. 1C caused by a difference in thermal expansion coefficient and so on) affecting the detection accuracy occurs in some cases depending on the use environment of the physical quantity sensor 100. Therefore, in the present embodiment, on the principal surface of the substrate 10, the contact section 81 in the fixation section 41 is disposed in the fixation section 41 (a fixation section 41G) extending to a second area G outside a first area D obtained by imaginarily extending a fixed support area F, which is sandwiched by edge portions of an area where the connection portion 51 and the fixation section 41 are connected to each other, in the displacement direction (the X-axis direction) of the movable electrode 50. The specific explanation will hereinafter be presented.

The fixed support area F sandwiched by the edge portions of the area where the connection portion 51 and the fixation section 41 are connected to each other denotes an area sandwiched by the line F1 and the line F2 shown in FIG. 1B. The line F1 represents the edge portion on the +Y side where the fixation section 41 and the connection portion 51 are connected to each other, and the line F2 represents the edge portion on the −Y side where the fixation section 41 and the connection portion 51 are connected to each other. In other words, the fixed support area F sandwiched by the lines F1, F2 denotes an area where the connection portion 51 disposed as a pair of connection beams is connected so as to hold the fixation section 41 in between, and an area forming a supporting point at which the fixation section 41 supports the movable electrode 50. In other words, the fixed support area F is an area through which the stress is transmitted between the fixation section 41 and the movable electrode 50.

Since the physical quantity sensor 100 takes the displacement of the movable electrode 50 in the X-axis directions as a fundamental operation as described above, in the case in which a stress (in particular a stress in the X-axis directions) other than the physical quantity to be the detection object acts on the fixed support area F, the displacement of the movable electrode 50 is affected in some cases.

Therefore, in the present embodiment, at least in the configuration of the physical quantity sensor 100, in order to arrange that the stress to be transmitted to the fixed support area F is reduced, the position of the contact section 81 is set to the position structurally separated from the fixed support area F in the case of disposing the contact section 81 in the fixation section 41. Specifically, as shown in FIG. 1B, the fixation section 41 is made to extend as the fixation section 41G to the second area G outside the first area D obtained by imaginarily extending the fixed support area F in the displacement direction (the X-axis direction) of the movable electrode 50, and the contact section 81 is formed in the second area G.

FIGS. 2A through 2D show the physical quantity sensor 99 according to the related art. FIG. 2A is a plan view of the physical quantity sensor 99, FIG. 2B is an enlarged view of the E section in FIG. 2A, FIG. 2C is a cross-sectional view along the A-A line shown in FIG. 2B, and FIG. 2D is a cross-sectional view along the B-B line shown in FIG. 2B.

The physical quantity sensor 99 is similar to the physical quantity sensor 100 except the point that a fixation section 941 is provided instead of the fixation section 41.

In the case of the physical quantity sensor 99, the contact section 81 in the fixation section 941 is disposed in the first area D obtained by imaginarily extending the fixed support area F, which is sandwiched by the edge portions of the area where the connection portion 51 and the fixation section 941 are connected to each other, in the displacement direction (the X-axis direction) of the movable electrode 50. In such a case, even in the case in which the slits 999 intended to relax the stress are provided, the upthrust stress propagated to the fixation section 941 from the protruding portion 82 via the contact section 81 is apt to directly be transmitted to the fixed support area F adjacent to the fixation section 941, and therefore, in some cases, the movable electrode 50 is deformed or the displacement of the movable electrode is affected by the stress.

As described hereinabove, according to the physical quantity sensor related to the present embodiment, the following advantages can be obtained.

The contact section 81 is disposed in the fixation section 41 (the fixation section 41G) in the second area G outside the first area D obtained by imaginarily extending the fixed support area F in the displacement direction (the X-axis direction) of the movable electrode 50. In other words, it results that the stress generated in the contact section 81 is transmitted to the fixed support area F (the area including the part where the movable electrode 50 (the connection portion 51) and the fixation section 41 are connected to each other) from the second area G through a path via the fixation section 41 (the fixation section 41D) in the first area D. Therefore, even in the configuration in which the fixation section 41 is stacked so as to cover a part of the wiring line 30 and has contact with the wiring line 30 on the principal surface of the substrate 10 (i.e., even in the case of the configuration in which the wiring line 30 to be connected to the fixation section 41 is disposed in the under layer of the fixation section 41 to thereby have contact with the fixation section 41 from the under layer), a degree of transmission of the stress (the stress of pushing up the contact section 81 from the under layer of the fixation section 41) to the movable electrode 50 can be reduced. As a result, it is possible to inhibit the stress applied to the movable electrode 50 from deforming the movable electrode 50, and from affecting the displacement of the movable electrode 50, and thus, the degradation of the detection accuracy as the sensor can be prevented.

Further, the fixation sections 41, 42, the stationary electrode 60, and the movable electrode 50 can more easily and conveniently be formed by patterning and photo-etching the silicon substrate stacked on the principal surface of the substrate 10 (the glass substrate) using a photolithography process. Further, even in the case in which a thermal stress is generated in the contact section 81 due to a difference in thermal expansion coefficient between the glass substrate and the silicon substrate, since there is adopted the configuration in which the stress to be transmitted from the contact section 81 to the fixed support area F is reduced, it is possible to inhibit the stress applied to the movable electrode 50 from deforming the movable electrode 50, and from affecting the displacement of the movable electrode 50, and thus, the degradation of the detection accuracy as the sensor can be prevented.

Second Embodiment

Next, a vibratory device according to a second embodiment will be explained. It should be noted that in the explanation, the constituents identical to those in the embodiment described above will be denoted with the same reference symbols, and any redundant explanation will be omitted.

Figure 3B:
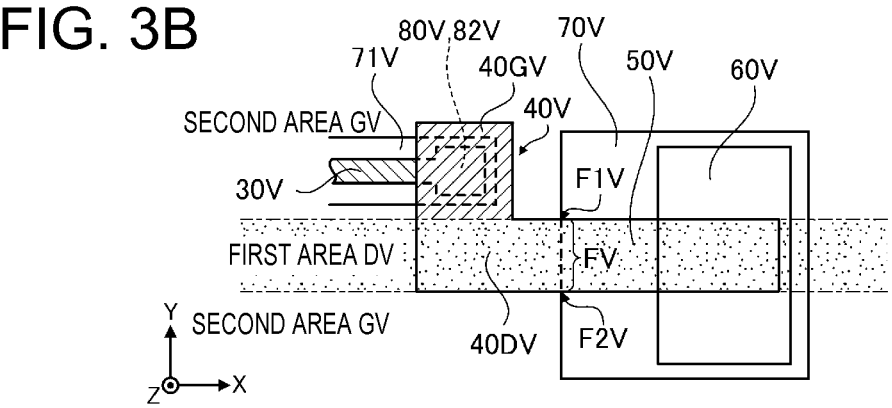

FIGS. 3A and 3B are schematic diagrams showing a vibratory device 200 according to the second embodiment, wherein FIG. 3A is a perspective view, and FIG. 3B is a plan view.

While the movable electrode 50 is the movable electrode to be displaced in the X-axis directions in the embodiment 1, in the second embodiment, the movable electrode has a clamped-free beam structure in which the movable electrode is displaced or vibrates in the Z-axis directions.

The vibratory device 200 is a clamped-free beam type vibratory device, and is provided with a substrate 10V, a vibratory element 20V, a wiring line 30V, and so on.

The vibratory element 20V is provided with a fixation section 40V, a movable electrode 50V, a stationary electrode 60V, and so on.

The substrate 10V is a plate-like body for supporting the vibratory element 20V, and functions as a base substrate.

The substrate 10V has an upper surface as a principal surface provided with a recessed portion 70V. The recessed portion 70V is formed in an area where the movable electrode 50V and the stationary electrode 60V fall in the plan view of the substrate 10V.

The fixation section 40V is disposed in an outside area of the area of the recessed portion 70V in the plan view of the substrate 10V so as to be bonded to the principal surface of the substrate 10V. Specifically, the fixation section 40V is bonded to a part of the principal surface of the substrate 10V on the −X direction side (the left side in the drawing) of the recessed portion 70V.

The movable electrode 50V is a rectangular plate-like body with the longitudinal direction facing the X direction, and is supported by the fixation section 40V so as to be separated in the recessed portion 70V from the principal surface of the substrate 10V. Specifically, the left end portion of the plate-like body including the fixation section 40V and the movable electrode 50V integrally with each other is bonded to the principal surface of the substrate 10V to thereby constitute the fixation section 40V, and the portion of the plate-like body separated from the principal surface with the recessed portion 70V is configured as the movable electrode 50V.

The stationary electrode 60V is an electrode disposed on the principal surface within the area of the recessed portion 70V, and having a rectangular shape in the plan view. The stationary electrode 60V is disposed at a position where at least a part of the movable electrode 50V and at least a part of the stationary electrode 60V overlap each other in the plan view of the substrate 10V. The depth in the Z-axis direction of the recessed portion 70V is larger than the thickness of the stationary electrode 60V, and therefore, the movable electrode 50V and the stationary electrode 60V overlap each other with a gap.

In the vibratory device 200 having such a configuration, the movable electrode 50V vibrates due to an electrostatic force of a charge generated in accordance with an alternating-current voltage applied between the electrodes (between the movable electrode 50V and the stationary electrode 60V). A signal of the natural resonant frequency of the vibratory device 200 is output to the electrodes.

The wiring line 30V is an electrical connection wiring line for applying the alternating-current voltage between the movable electrode 50V and the stationary electrode 60V, and there are disposed the wiring line 30V to be connected to an electrode (not shown) for connecting the fixation section 40V and an external circuit to each other, and a wiring line (not shown) to be connected to an electrode for connecting the stationary electrode 60V and the external circuit to each other. It should be noted that the wiring line 30V is omitted from the perspective view of FIG. 3A.

As the configuration of electrically connecting the fixation section 40V and the wiring line 30V to each other, there is adopted a structure of making the wiring line 30V have contact with the fixation section 40V from the under layer of the fixation section 40V similarly to the case of the first embodiment. Specifically, there is adopted a configuration in which the principal surface of the substrate 10V on which the wiring line 30V is laid is provided with the recessed portion 71V, the protruding portion 82V (a part where the depth dimension of the recessed portion 71V is smaller than the thickness of the wiring line 30V) is formed in a connection section (the contact section 80V) between the fixation section 40V and the wiring line 30V, the pattern of the wiring line 30 is formed by stacking the wiring line 30 so as to overlap at least a part of the protruding portion 82V, and the fixation section 40V is stacked on the wiring line 30V, and thus, the wiring line 30V on the protruding portion 82V has contact with, and is thus electrically connected to the fixation section 40V.

Further, in the structure of making the wiring line 30V have contact with the fixation section 40V from the under layer of the fixation section 40V in such a manner as described above, the contact section 80V is disposed in the fixation section 40V in the second area GV outside the first area DV obtained by imaginarily extending the fixed support area FV, which is sandwiched by the edge portions of the area where the movable electrode 50V and the fixation section 40V are connected to each other, in the direction along the vibrating surface of the movable electrode 50V. The specific explanation will hereinafter be presented.

The fixed support area FV sandwiched by the edge portions of the area where the movable electrode 50V and the fixation section 40V are connected to each other denotes an area sandwiched by the both end portions F1V, F2V of the area where the movable electrode 50V and the fixation section 40V are connected to each other, and an area to be a support point at which the fixation section 40V supports the movable electrode 50V. In other words, the fixed support area FV is an area through which the stress is transmitted between the fixation section 40V and the movable electrode 50V.

Since the vibratory device 200 takes the displacement (vibration) of the movable electrode 50V in the Z-axis directions as a fundamental operation as described above, in the case in which a stress (in particular a stress in the Z-axis directions) acts on the fixed support area FV, the displacement (the vibration) of the movable electrode 50V is affected in some cases.

Therefore, in the present embodiment, at least in the configuration of the vibratory device 200, in order to arrange that the stress to be transmitted to the fixed support area FV is reduced, the position of the contact section 80V is set to the position structurally separated from the fixed support area FV in the case of disposing the contact section 80V in the fixation section 40V. Specifically, as shown in FIG. 3B, the fixation section 40V is made to extend to the position included in the second area GV outside the first area DV obtained by imaginarily extending the fixed support area FV in the displacement direction (the direction along the vibrating surface) of the movable electrode 50V, and the contact section 80V is formed in the second area GV.

As described hereinabove, according to the vibratory device related to the present embodiment, the following advantages can be obtained.

The contact section 80V is disposed in the fixation section 40V in the second area GV outside the first area DV. In other words, it results that the stress generated in the contact section 80V is transmitted to the fixed support area FV (i.e., the area including the part where the movable electrode 50V and the fixation section 40V are connected to each other) from the second area GV through a path via the fixation section 40V in the first area DV. Therefore, even in the configuration in which the wiring line 30V to be connected to the fixation section 40V is disposed in the under layer of the fixation section 40V, and is made to have contact with the fixation section 40V from the under layer of the fixation section 40V (i.e., even in the case of adopting the configuration in which the wiring line 30V to be connected to the fixation section 40V is disposed in the under layer of the fixation section 40V, and is made to have contact with the fixation section 40V from the under layer of the fixation section 40V), a degree of transmission of the stress (the stress of pushing up the contact section 80V from the under layer of the fixation section 40V) to the movable electrode 50V can be reduced. As a result, it is possible to inhibit the stress applied to the movable electrode 50V from deforming the movable electrode 50V, and from affecting the displacement (the vibration) of the movable electrode 50V, and thus, the degradation of the accuracy as the vibratory device can be prevented.

Figure 3C:
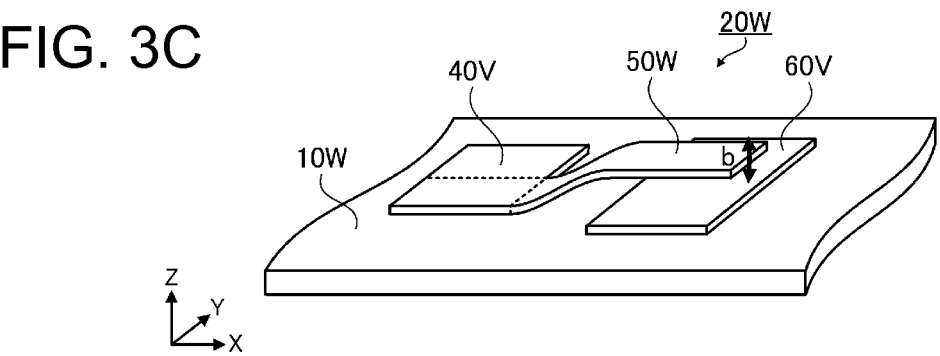

It should be noted that the configuration for detaching the movable electrode 50V from the substrate 10V is not limited to the configuration of providing the recessed portion 70V as described above. It is also possible to adopt a configuration of, for example, like the vibratory element 20W including the movable electrode 50W shown in FIG. 3C, lifting the movable electrode 50W so as to gradually bend in the +Z direction from the connection section with the fixation section 40V to thereby be separated from the substrate 10W and the stationary electrode 60V.

Further, the vibratory element is not limited to the clamped-free beam type vibratory element such as the vibratory elements 20V, 20W, but can also be a clamped-clamped beam type.

Electronic Apparatus

Next, electronic apparatuses, to which the physical quantity sensor 100 or the vibratory device 200 as an electronic component according to an embodiment of the invention is applied, will be explained with reference to FIGS. 4A, 4B, and 5.

Figure 4A:
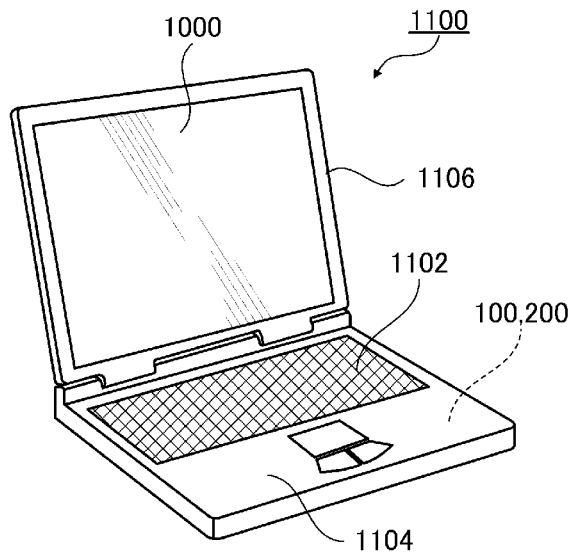
FIG. 4A is a perspective view showing a configuration of a mobile personal computer as an example of an electronic apparatus.

FIG. 4A is a perspective view showing an outline of a configuration of a mobile type (or a laptop type) personal computer as the electronic apparatus equipped with the electronic component according to the embodiment of the invention. In the drawing, the personal computer 1100 includes a main body section 1104 provided with a keyboard 1102, and a display unit 1106 provided with a display section 1000, and the display unit 1106 is pivotally supported with respect to the main body section 1104 via a hinge structure. Such a personal computer 1100 incorporates the physical quantity sensor 100 or the vibratory device 200 as the electronic component functioning as a filter, a resonator, a reference clock, and so on.

Figure 4B:
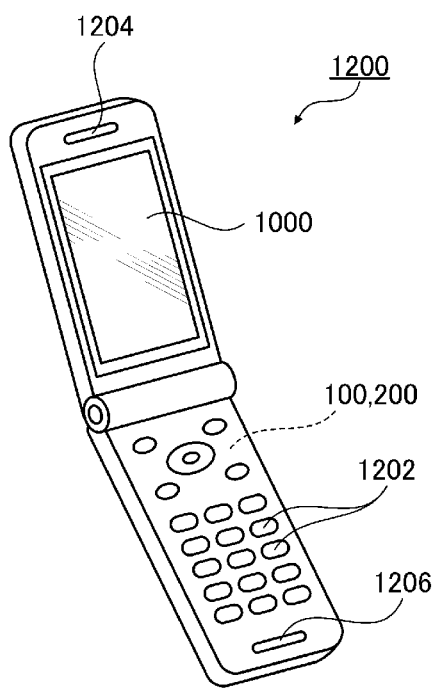
FIG. 4B is a perspective view showing a configuration of a cellular phone as an example of the electronic apparatus.

FIG. 4B is a perspective view showing an outline of a configuration of a cellular phone (including PHS) as the electronic apparatus equipped with the electronic component according to the embodiment of the invention. In this drawing, the cellular phone 1200 is provided with a plurality of operation buttons 1202, an ear piece 1204, and a mouthpiece 1206, and a display section 1000 is disposed between the operation buttons 1202 and the ear piece 1204. Such a cellular phone 1200 incorporates the physical quantity sensor 100 or the vibratory device 200 as the electronic component (a timing device) functioning as a filter, a resonator, an angular velocity sensor, and so on.

Figure 5:
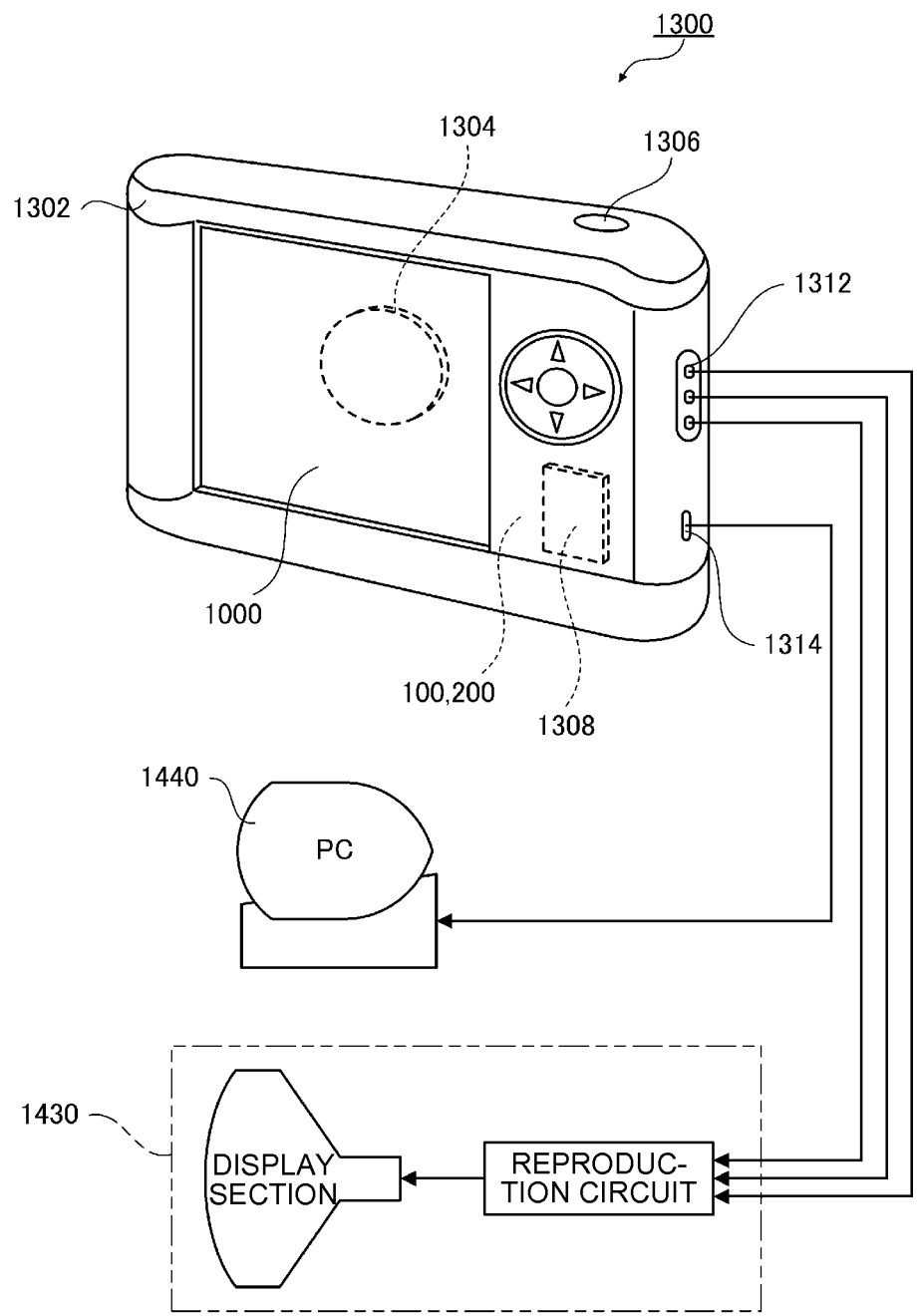
FIG. 5 is a perspective view showing a configuration of a digital still camera as an example of the electronic apparatus.

FIG. 5 is a perspective view showing an outline of a configuration of a digital still camera as the electronic apparatus equipped with the electronic component according to the embodiment of the invention. It should be noted that the connection with external equipment is also shown briefly in this drawing. The digital still camera 1300 performs photoelectric conversion on an optical image of an object using an imaging element such as CCD (Charge Coupled Device) to thereby generate an imaging signal (an image signal).

A case (a body) 1302 of the digital still camera 1300 is provided with a display section 1000 disposed on the back surface of the case 1302 to provide a configuration of performing display in accordance with the imaging signal from the CCD, wherein the display section 1000 functions as a viewfinder for displaying the object as an electronic image. Further, the front surface (the reverse side in the drawing) of the case 1302 is provided with a light receiving unit 1304 including an optical lens (an imaging optical system), the CCD, and so on.

When the photographer checks an object image displayed on the display section 1000, and then holds down a shutter button 1306, the imaging signal from the CCD at that moment is transferred to and stored in a memory device 1308. Further, the digital still camera 1300 is provided with video signal output terminals 1312 and an input/output terminal 1314 for data communication disposed on a side surface of the case 1302. Further, as shown in the drawing, a television monitor 1430 and a personal computer 1440 are respectively connected to the video signal output terminals 1312 and the input-output terminal 1314 for data communication according to needs. Further, there is adopted the configuration in which the imaging signal stored in the memory device 1308 is output to the television monitor 1430 and the personal computer 1440 in accordance with a predetermined operation. Such a digital still camera 1300 incorporates the physical quantity sensor 100 or the vibratory device 200 as the electronic component functioning as a filter, a resonator, an angular velocity sensor, and so on.

As described above, by providing the electronic apparatus with the physical quantity sensor 100 further suppressed in degradation of the detection accuracy or the vibratory device 200, the electronic apparatus with higher operating accuracy can be provided.

It should be noted that, the physical quantity sensor 100 or the vibratory device 200 according to the embodiment of the invention can also be applied to an electronic apparatus such as an inkjet ejection device (e.g., an inkjet printer), a laptop personal computer, a television set, a video camera, a car navigation system, a pager, a personal digital assistance (including one with a communication function), an electronic dictionary, an electric calculator, a computerized game machine, a workstation, a video phone, a security video monitor, a pair of electronic binoculars, a POS terminal, a medical device (e.g., an electronic thermometer, an electronic manometer, an electronic blood sugar meter, an electrocardiogram measurement instrument, an ultrasonograph, and an electronic endoscope), a fish detector, various types of measurement instruments, various types of gauges (e.g., gauges for a vehicle, an aircraft, or a ship), and a flight simulator in addition to the personal computer (the mobile personal computer) shown in FIG. 4A, the cellular phone shown in FIG. 4B, and the digital still camera shown in FIG. 5.

Moving Object

Next, a moving object, to which the physical quantity sensor 100 or the vibratory device 200 according to the embodiment of the invention is applied, will be explained based on FIG. 6.

Figure 6:
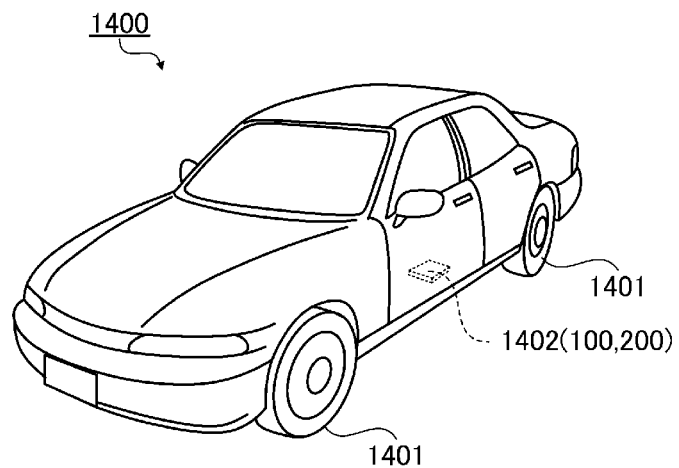
FIG. 6 is a perspective view schematically showing a vehicle as an example of a moving object.

FIG. 6 is a perspective view schematically showing a vehicle 1400 as the moving object equipped with the physical quantity sensor 100 or the vibratory device 200. The vehicle 1400 is equipped with a gyro sensor configured including the physical quantity sensor 100 or the vibratory device 200 according to the embodiment of the invention. For example, as shown in the drawing, in the vehicle 1400 as the moving object, an electronic control unit 1402 incorporating the gyro sensor and for controlling tires 1401 is installed. Further, as other examples, the physical quantity sensor 100 or the vibratory device 200 can widely be applied to an electronic control unit (ECU) such as a keyless entry system, an immobilizer, a car navigation system, a car air-conditioner, an anti-lock braking system (ABS), an airbag system, a tire pressure monitoring system (TPMS), an engine controller, a battery monitor for a hybrid car or an electric car, or a vehicle posture control system.

As described above, by providing the moving object with the physical quantity sensor 100 or the vibratory device 200 further suppressed in degradation of accuracy, the moving object with higher operating accuracy can be provided.

It should be noted that the invention is not limited to the embodiments described above, but various modifications or improvements can be provided to the embodiments described above. Some modified examples will be described below. Here, the constituents identical to those in any of the embodiments described above will be denoted with the same reference symbols, and any redundant explanation will be omitted.

Figure 7A:
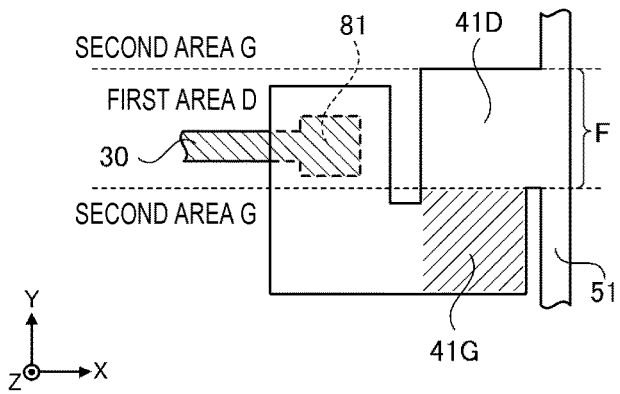
FIGS. 7A through 7C are plan views showing fixation sections and contact sections of physical quantity sensors according to first through third modified examples, respectively.
Figure 7B:
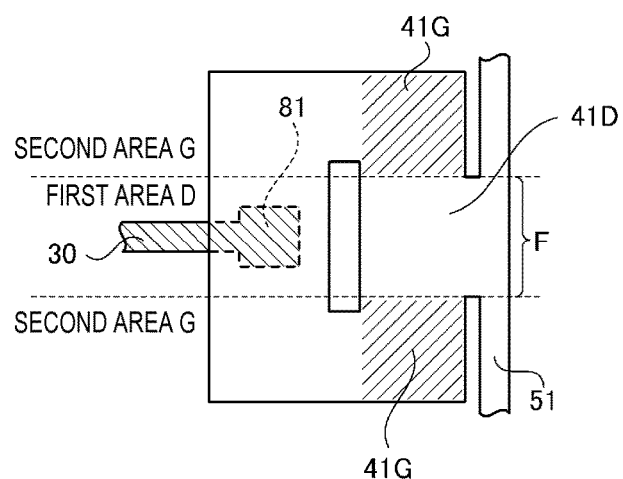
Figure 7C:
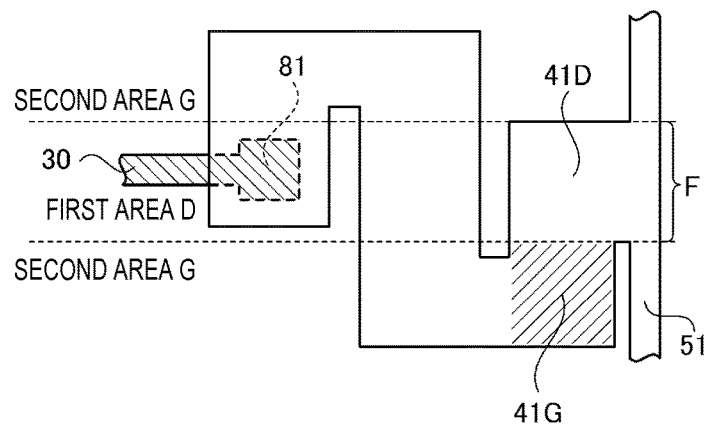

FIGS. 7A through 7C are plan views showing fixation sections and contact sections of physical quantity sensors according to first through third modified examples, respectively.

In the first embodiment, the explanation is presented assuming that the fixation section 41 is made to extend as the fixation section 41G to the second area G outside the first area D obtained by imaginarily extending the fixed support area F in the displacement direction (the X-axis direction) of the movable electrode 50, and the contact section 81 is formed in the second area G as shown in FIG. 1B. In the first through third modified examples, the contact section 81 is disposed in an area to which the fixation section 41 further extends from the fixation section 41G in the second area G. It is arranged that the stress generated in the contact section 81 is transmitted to the fixation section 41D via the fixation section 41G, and is then further transmitted to the movable electrode 50.

First Modified Example

In the first modified example shown in FIG. 7A, the fixation section 41 is further extended in the −X direction from the fixation section 41G in the second area G, and then further extended in the +Y direction to thereby form an area returned to the first area D, and the contact section 81 is disposed in the area.

According to the present modified example, although the contact section 81 is disposed in the first area D the same as the area where the fixation section 41D including the fixed support area F is disposed, the stress generated in the contact section 81 is not directly transmitted to the fixation section 41D, or is suppressed, and is transmitted to the fixation section 41D via the fixation section 41G, and is then further transmitted to the movable electrode 50. As a result, similarly to the first embodiment, it is possible to inhibit the stress applied to the movable electrode 50 from deforming the movable electrode 50, and from affecting the displacement of the movable electrode 50, and thus, the degradation of the detection accuracy as the sensor can be prevented.

Second Modified Example

In the second modified example shown in FIG. 7B, the fixation section 41 is further extended in the −X direction from the fixation sections 41G respectively disposed in two places, namely anterior and posterior (±Y directions) places of the fixation section 41D, then further extended in the −Y direction from the fixation section 41 on the +Y direction side, and in the +Y direction from the fixation section 41 on the −Y direction side to thereby form a combined area returned to the first area D, and the contact section 81 is disposed in the combined area.

According to the present modified example, although the contact section 81 is disposed in the first area D the same as the area where the fixation section 41D including the fixed support area F is disposed, the stress generated in the contact section 81 is not directly transmitted to the fixation section 41D, or is suppressed, and is transmitted to the fixation section 41D via the fixation sections 41G disposed in the two places, namely the anterior and posterior (±Y directions) places of the fixation section 41D, and is then further transmitted to the movable electrode 50.

As a result, similarly to the first embodiment, it is possible to inhibit the stress applied to the movable electrode 50 from deforming the movable electrode 50, and from affecting the displacement of the movable electrode 50, and thus, the degradation of the detection accuracy as the sensor can be prevented. Further, in the present modified example, the electric resistance between the contact section 81 and the movable electrode 50 can be decreased to a lower level compared to the first modified example.

Third Modified Example

In the third modified example shown in FIG. 7C, the fixation section 41 is further extended compared to the first modified example. Specifically, the fixation section 41 is further extended so as to bend in the +Y direction, the −X direction, and the −Y direction.

According to the present modified example, the stress generated in the contact section 81 is not directly transmitted to the fixation section 41D, or is suppressed, and is transmitted to the fixation section 41D via the fixation section 41 thus bent, and is then further transmitted to the movable electrode 50. As a result, similarly to the first embodiment, it is possible to inhibit the stress applied to the movable electrode 50 from deforming the movable electrode 50, and from affecting the displacement of the movable electrode 50, and thus, the degradation of the detection accuracy as the sensor can be prevented.

Fourth Modified Example

Figure 8:
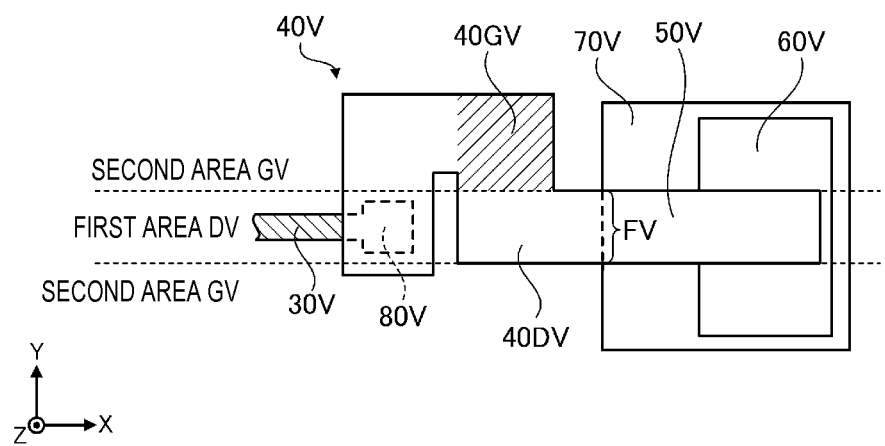
FIG. 8 is a plan view showing a vibratory device according to a fourth modified example.

FIG. 8 is a plan view showing a vibratory device according to a fourth modified example.

In the second embodiment, the explanation is presented assuming that the fixation section 40V is made to extend to the position included in the second area GV outside the first area DV obtained by imaginarily extending the fixed support area FV in the displacement direction (the direction along the vibrating surface) of the movable electrode 50V, and the contact section 80V is formed in the second area GV as shown in FIG. 3B. In the present modified example, the contact section 80V is disposed in an area to which the fixation section 40V further extends from the fixation section 40GV in the second area GV.

Specifically, the fixation section 40V is further extended in the −X direction from the fixation section 40GV in the second area GV, and then further extended in the −Y direction to thereby form an area returned to the first area DV, and the contact section 80V is disposed in the area.

According to the present modified example, although the contact section 80V is disposed in the first area DV the same as the area where the fixation section 40DV including the fixed support area FV is disposed, the stress generated in the contact section 80V is not directly transmitted to the fixation section 40DV, or is suppressed, and is transmitted to the fixation section 40DV via the fixation section 40GV, and is then further transmitted to the movable electrode 50V.

As a result, similarly to the second embodiment, it is possible to inhibit the stress applied to the movable electrode 50V from deforming the movable electrode 50V, and from affecting the displacement (the vibration) of the movable electrode 50V, and thus, the degradation of the accuracy as the vibratory device can be prevented.

Further, although not shown in the drawings, as the configuration of disposing the contact section 80V in the area obtained by further extending the fixation section 40V from the fixation section 40GV in the second area GV, it is also possible to adopt configurations similar to the configurations explained with reference to FIGS. 7B and 7C. Specifically, it is also possible to adopt a configuration in which the fixation section 40V is further extended in the −X direction from the fixation sections 40GV respectively disposed in two places, namely anterior and posterior (±Y directions) places of the fixation section 40DV, then further extended in the −Y direction from the fixation section 40V on the +Y direction side, and in the +Y direction from the fixation section 40V on the −Y direction side to thereby form a combined area returned to the first area DV, and the contact section 80V is disposed in the combined area. Further, it is also possible to adopt a configuration in which the fixation section 40V is further extended so as to bend in the −Y direction, the −X direction, and the +Y direction in the fourth modified example.

The entire disclosure of Japanese Patent Application No. 2013-187148 filed Sep. 10, 2013 is hereby expressly incorporated by reference herein in its entirety.

What is claimed is:

1. A device comprising:
a substrate;
a wiring line provided on the substrate;
a movable electrode electrically connected to the wiring line, the movable electrode being configured with:
  a movable electrode base that is in a longitudinal shape extending in an longitudinal direction; and
  a plurality of movable electrode fingers that are provided at both sides of the movable electrode base and that extend from the movable electrode base in a first direction perpendicular to the longitudinal direction;
a fixation section that fixes an end of the movable electrode base to the substrate at a first position so that the movable electrode is movably connected to the substrate, the fixation section extending in the first direction from the end of the movable electrode base;
a contact section where the fixation section located at a second position and the wiring line are physically and electrically connected to each other,
wherein the fixation section located at the first position is on a center line of the movable electrode base in the longitudinal direction, and
the fixation section located at the second position is laterally shifted from the center line in the first direction.

2. The device according to claim 1, wherein
the fixation section and the wiring line are electrically connected to each other by the contact section so that the fixation section covers a part of the wiring line in a plan view.

3. The device according to claim 1, wherein
the movable electrode includes a connection portion, and
the connection portion is located directly adjacent to the end of the movable electrode base so as to make the movable electrode easily displace.

4. The device according to claim 1, wherein
the substrate is a glass substrate, and
the fixation section and the movable electrode are formed of a silicon substrate stacked on the glass substrate.

5. The device according to claim 1, wherein
the device is a physical quantity sensor.

6. A device comprising:
a substrate;
a wiring line provided on the substrate;
a movable electrode electrically connected to the wiring line, the movable electrode being configured with:
  a movable electrode base that is in a longitudinal shape extending in an longitudinal direction; and
  a plurality of movable electrode fingers that are provided at both sides of the movable electrode base and that extend from the movable electrode base along first and second directions perpendicular to the longitudinal direction;
a fixation section that fixes an end of the movable electrode base to the substrate at a first position so that the movable electrode is movably connected to the substrate, the fixation section being U-shaped so that the fixation section extends in the first direction from the end of the movable electrode base to a second position, further continuously extends in the longitudinal direction away from the movable electrode base to a third position, and further continuously extends in the second direction to a fourth position;
a contact section where the fixation section located at the fourth position and the wiring line are physically and electrically connected to each other,
wherein the fixation section located at the first position and the fourth position is on a center line of the movable electrode base in the longitudinal direction,
the fixation section located at the second position is laterally shifted from the center line in the first direction,
the fixation section located at the fourth position is spaced apart from the fixation section located at the first position via an air gap in a plan view in the longitudinal direction.

7. The device according to claim 6, wherein
the fixation section and the wiring line are electrically connected to each other by the contact section so that the fixation section covers a part of the wiring line in the plan view.

8. The device according to claim 6, wherein
the movable electrode includes a connection portion, and
the connection portion is located directly adjacent to the end of the movable electrode base so as to make the movable electrode easily displace.

9. The device according to claim 6, wherein
the substrate is a glass substrate, and
the fixation section and the movable electrode are formed of a silicon substrate stacked on the glass substrate.

10. The device according to claim 6, wherein
the device is a vibratory device.

* * * * *